April 13, 1926.  1,580,917
E. D. PUTT
MACHINE FOR CUTTING MATERIAL ON THE BIAS
Original Filed April 23, 1923  3 Sheets-Sheet 1
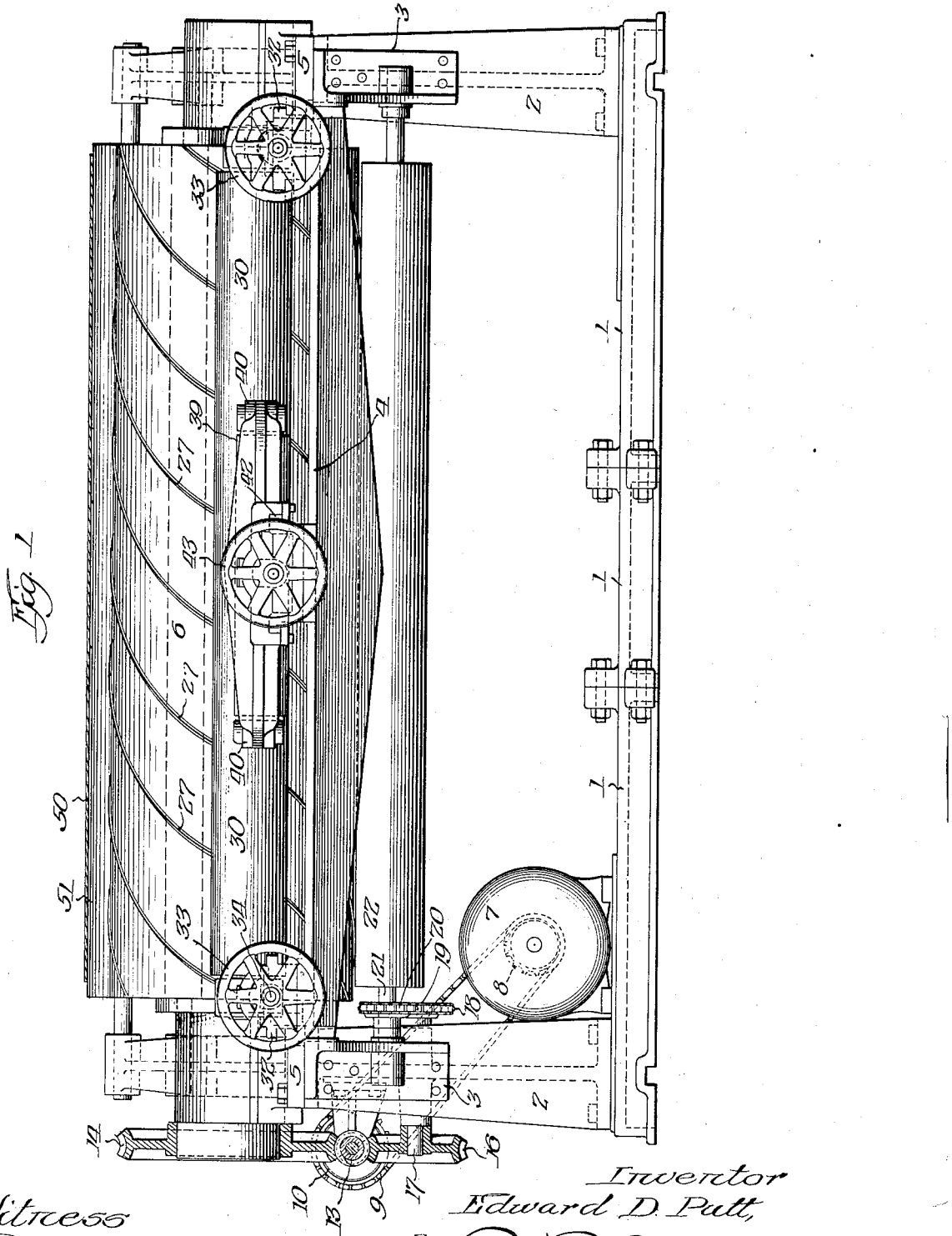

April 13, 1926.
E. D. PUTT
1,580,917
MACHINE FOR CUTTING MATERIAL ON THE BIAS
Original Filed April 23, 1923   3 Sheets-Sheet 2
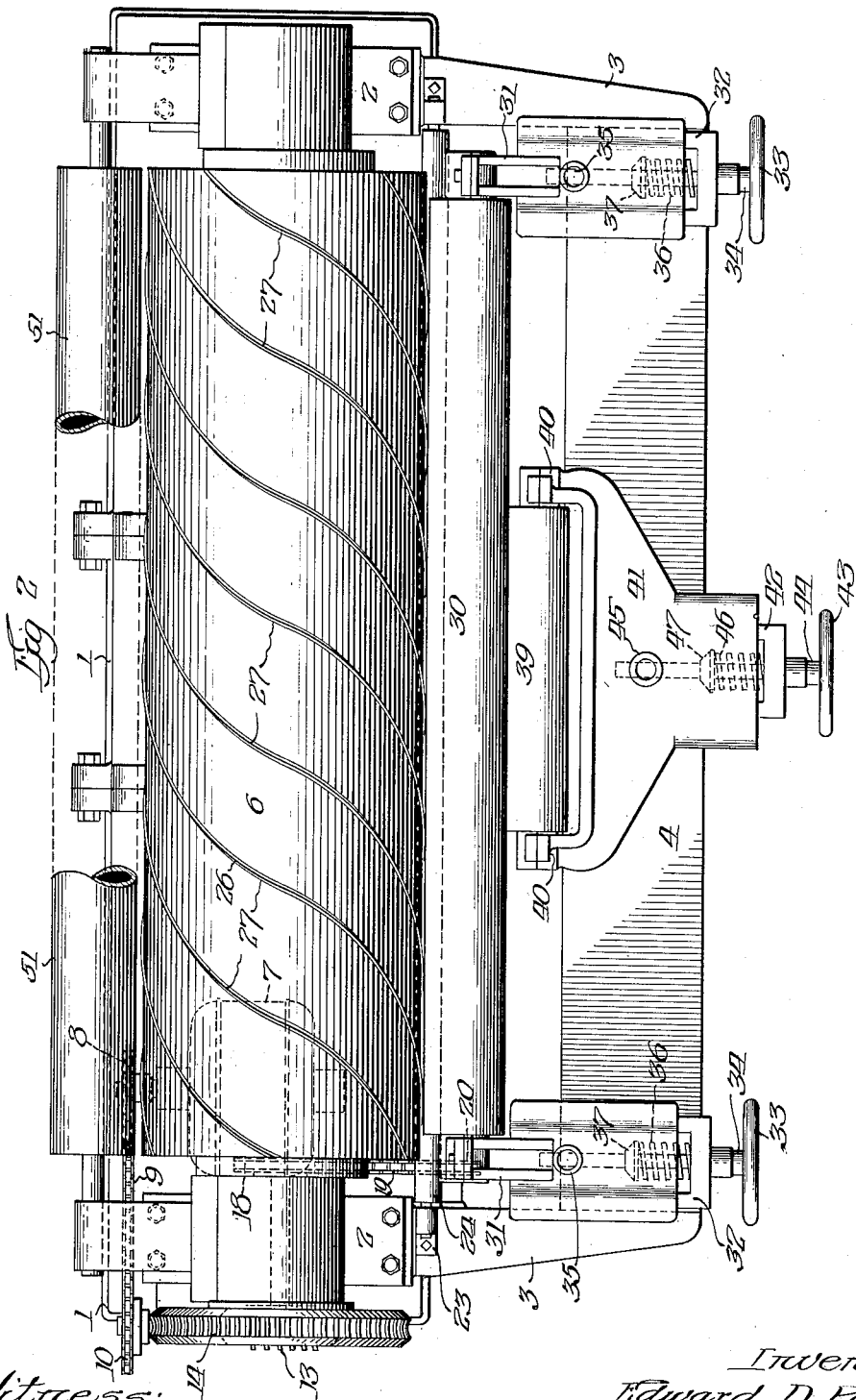

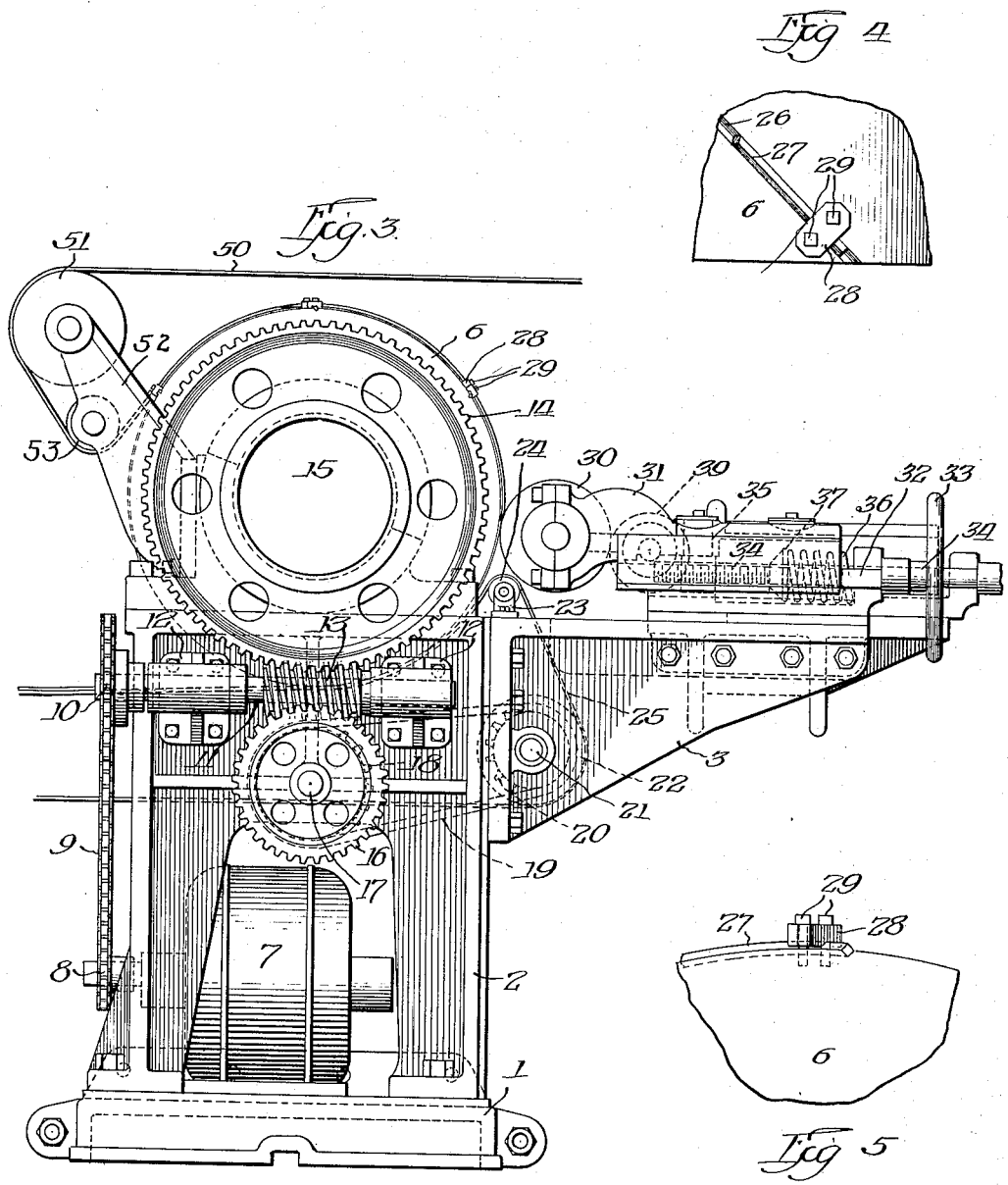

Patented Apr. 13, 1926.

1,580,917

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

MACHINE FOR CUTTING MATERIAL ON THE BIAS.

Application filed April 23, 1923, Serial No. 633,838. Renewed January 16, 1926.

*To all whom it may concern:*

Be it known that I, EDWARD D. PUTT, a citizen of the United States, residing at Akron, in the county of Summit, State of Ohio, have invented certain new and useful Improvements in a Machine for Cutting Material on the Bias, of which the following is a specification.

The invention relates to machinery for cutting material on the bias, and involves carrying forward and improving the invention set forth in my prior application Serial Number 475,021, filed June 4, 1921. In the manufacture of pneumatic tires for automobiles and in similar operations, it is necessary to have lengths of fabric which are cut at an angle of 45° to the length of the original fabric, or, as is termed in the art "on the bias." For performing the cutting operation there have been in common use two types of machines. One of these types is found in a machine in which the fabric has been severed by a vertically operating shear set at an angle of 45°, the fabric being drawn under the knife by reciprocating gripper fingers. Another type of machine in general use, is provided with a reciprocating blade which travels in a diagonal line across the fabric held in a vertical plane, the fabric being clamped in position by an intermittently operating clamp bar, and being fed forward and allowed to drop by gravity to provide a new cut.

While both types of machine have operated satisfactorily, the cost of their upkeep is very high and the operations are relatively slow. By the machine designed and shown here, the work of cutting the fabric is done more rapidly and accurately than is possible with the machines of the earlier types. The machine designed by me operates on quite a different principle than those previously in use and gives more satisfactory results than have been possible heretofore.

While the drawings and description accompanying this application are quite detailed, it is not my intention to limit myself to such a detailed embodiment of the invention. I am, therefore, entitled to such a broad range of equivalents as may be allowable.

In the drawings:

Figure 1 is a front elevation of my improved form of bias cutter;

Figure 2 is a plan view thereof;

Figure 3 is a side elevation;

Figure 4 is a detail showing the manner of holding the knife blade; and

Figure 5 is a fragmentary end view of the holding means shown in Figure 4.

The machine for cutting fabric at an angle of 45°, or at any other angle, if desired, comprises a roller on the surface of which are secured a number of spiral blades arranged at the desired angle or pitch, to the axis of the cylinder, and the fabric is led over this roller and pressed against it by a pressure device so that it is severed in strips at the required angle. In this way the fabric is cut as fast as it can be passed through the machine and the cuts are made accurately and all danger of faulty cuts is eliminated. Furthermore the fabric is always in smooth condition and wrinkled or badly cut fabric is impossible.

The machine rises from a base 1 at the sides of which are mounted two standards or uprights 2, which support the operating parts of the machine. From one side of the standards are projected a pair of brackets 3 which support a table or platform 4, on which is mounted the pressure roll. On the upper surface of the standards are carried bearings 5, which form the support for a knife or blade carrying cylinder 6.

On the base of the machine is mounted a motor 7, the shaft of which carries a sprocket 8, over which is trained a chain 9, which in turn drives a sprocket 10 on a drive shaft 11, mounted in bearings 12 on the side of one of the standards 2. Between the bearings 12 the shaft carries a worm 13, which meshes with a large worm 14 on the ends of the shaft 15 of the cylinder 6. The worm also meshes with a gear 16 on the end of a shaft 17, suitably mounted in bearings in the frame of the machine. Shaft 17 carries a sprocket 18 which drives through a chain 19, a second sprocket 20 on the shaft 21 of a long pulley 22, supported in the brackets 3. Upon the top face of the table 4 are brackets 23 provided with bearings in which a long idle roller 24 is mounted. The pulley 22 and the roller 24 support and drive a belt 25 which carries off the cut fabric. The speed of the belt may be suitably timed, but it is preferred to drive it slightly faster than the knife cylinder, so that the pieces of cut fabric are separated to a certain extent as they are delivered by the knife drum.

The surface of the cylinder 6 is provided with a plurality of grooves 26 in which are seated the knife blades 27. The pitch and spacing of the grooves may be varied as found necessary, but for the purpose of making the invention clear, it will be assumed that the grooves are given a pitch of 45° so that the fabric will be cut at 45° to its center line. The blades may be of any desired shape, being here shown as flexible wires or bars which are square in cross-section, the grooves 26 being shaped to hold the blades with one edge exposed. The method of holding the blades in position will admit of many variations, the method provided here consisting in mounting cap plates 28 over the ends of the blades, which plates are securely held down by bolts 29 set into the surface of the drum 6. The blades 27 are set in position in the drum and clamped in place by the plates 28. The four edges of the blades are cutting edges so that by turning the blade over a new cutting surface may be exposed. In this way the life of each blade will be materially lengthened.

The blades are spaced apart a suitable distance to make strips of proper widths and the circumference of the drum should be of the proper size so that even cuts will be produced.

As the wires or bars forming the cutting element are square or approximately so, a heavy pressure is required to force the fabric into the wires so as to cut or finish it off. In the cutting of rubberized fabric by this machine, it has been found to be more satisfactory to use a pinching action to sever the fabric into the strips as required. To this end there is arranged at a convenient point about the drum, a suitable pressure device which forces the fabric against the bladed drum. This may be embodied in any desirable means, the one which I have shown herein being in the form of a spring held pinch roll 30. The pinch roll 30 is cylindrical and is rotatively mounted in forked arms 31 which are slidably mounted on guideways or tracks 32 arranged on the platform 4. The arms 31 are adjusted toward and from the surface of the knife cylinder by hand wheels 33, the shafts 34 of which are threaded into nuts 35. Springs 36 are arranged about the shafts 34 and bear against a collar 37 on the shaft, providing yielding pressure for the roll 30.

A cylindrical roll 39 is rotatively mounted in arms 40 integral with an adjustable carrier 41. The carrier 41 is slidably mounted on guideways or tracks 42 arranged on the platform 4. The cylindrical roll 39 is adapted to bear against the pinch roll 30 and to take up any spring in the latter. To this end the roll 39 is adjustable toward and from the surface of the pinch roll by hand wheel 43, the shaft 44 of which is threaded into a nut 45 carried by the slide 41. A spring 46 is arranged about the shaft 44 and bears against a collar 47 on the shaft, providing a yielding pressure for the roll 39.

The material to be cut, which is usually the rubberized fabric used in building tire casings, is indicated by the numeral 50 and comes from any suitable supply. In order to properly present the material to the knife, I provide a guide roll 51 supported in brackets 52. Below the roll 51 is a spreader roll 53 supported in bearings carried by the brackets 52. The fabric is led over the guide roll, around the spread roll and then passes around the drum. By this arrangement of parts described, all puckers are eliminated from the material and it is arranged upon the drum in a smooth, taut, unwrinkled condition. Assurance is thus afforded that there will be no variance of the strips from the predetermined width.

The mechanism which I have devised is simple and easily operated and its action is much more rapid than the action of prior bias cutters. The forms of the blades and the pressure device may be varied and other specific embodiments of the invention may be developed. Other changes and modifications may be made and will appear suitable and I am not limited to exact forms or proportions.

What I claim is:

1. A machine of the character set forth, having in combination, a cylindrical drum, a blade projecting from said drum and being mounted spirally thereon, pressure means to force material against the drum, and means constructed and arranged to engage said pressure means and to take up the spring therefrom.

2. A machine of the character described having, in combination, a cylindrical drum, a blade projecting from the surface of said drum and being spirally mounted thereon, a pressure roller bearing against the surface of the drum, and a second roller arranged to engage the pressure roller and to take up the spring therefrom.

3. A machine of the character described having, in combination, a cylindrical drum, a removable blade on said drum, said blade being spirally mounted thereon, a pressure device to force material against the blade, and yieldingly mounted means for engaging said pressure device to take up the spring therefrom.

4. A machine of the class described having, in combination, a cylindrical drum, a blade projecting from the surface of said drum and being mounted spirally thereon, yielding pressure means bearing against said drum, and yielding means for bearing against said pressure means and constructed to take up the spring therefrom.

5. A machine of the class described having, in combination, a cylindrical drum, a spirally arranged blade on said drum, yielding pressure means bearing against said blade, yielding bolstering means engaging said pressure means, and means for adjusting the pressure of said means.

6. A machine of the class described having, in combination, a cylindrical drum, cutting means mounted upon said drum, and means for receiving the work after it has been cut, said means being constructed and arranged to follow the drum along a portion of its periphery.

7. A machine of the class described having, in combination, a cylindrical drum, a blade projecting from the surface of the drum and being mounted spirally thereon, a pressure roll contacting with said drum, and means positioned within the bight of the drum and roll adjacent to the line of contact to receive the material as it leaves the drum.

8. A machine for cutting rubberized fabric in parallel bias strips, comprising a rotating roller, a blade projecting from the face of said roller, a presser roller, the fabric being passed between the said rollers, and a conveyor traveling through the bight on the discharging side of the rollers to receive the strips as soon as they leave the roller.

EDWARD D. PUTT.